(12) United States Patent
Ray et al.

(10) Patent No.: US 10,089,758 B1
(45) Date of Patent: Oct. 2, 2018

(54) VOLUME IMAGE RECONSTRUCTION USING PROJECTION DECOMPOSITION

(71) Applicant: Carestream Health, Inc., Rochester, NY (US)

(72) Inventors: Lawrence A. Ray, Rochester, NY (US); Richard A. Simon, Rochester, NY (US); Levon O. Vogelsang, Webster, NY (US)

(73) Assignee: Carestream Health, Inc., Rochester, NY (US)

( * ) Notice: Subject to any disclaimer, the term of this patent is extended or adjusted under 35 U.S.C. 154(b) by 0 days.

(21) Appl. No.: 15/472,613

(22) Filed: Mar. 29, 2017

(51) Int. Cl.
*G06T 11/00* (2006.01)
*G06T 5/00* (2006.01)

(52) U.S. Cl.
CPC ............ *G06T 11/008* (2013.01); *G06T 5/003* (2013.01); *G06T 5/009* (2013.01); *G06T 2207/10081* (2013.01)

(58) Field of Classification Search
CPC ......... G06T 5/003–5/009; G06T 15/00; G06T 15/08; G06T 2207/10072; G06T 2207/10081; G06T 2207/10124; G06T 11/008; A61B 6/032
See application file for complete search history.

(56) References Cited

U.S. PATENT DOCUMENTS 5,270,926 A   12/1993  Tam
5,999,587 A   12/1999  Ning et al.
7,602,879 B2  10/2009  Chen et al.
7,835,491 B2 * 11/2010  Fischer .................. A61B 6/502
                                                378/37
8,452,066 B2 *  5/2013  Oikawa .................. A61B 6/466
                                                345/419

(Continued)

OTHER PUBLICATIONS

"3D Forward and Back-Projection for X-Ray CT Using Separable Footprints."; Yong Long, Fessler, J.A., Baiter, J.M.; IEEE Transactions on Medical Imaging IEEE Trans. Med. Imaging Medical Imaging, IEEE Transactions on. 29(11):1839-1850 Nov. 2010.*

(Continued)

*Primary Examiner* — Michael Osinski

(57) ABSTRACT

A method for forming an image reconstructs a volume image according to X-ray projection images acquired at acquisition angles. The full volume image is partitioned to form at least a first and a second non-overlapping sub-volume. Within each sub-volume, forward projection images for the sub-volume are calculated, with the corresponding forward projection images computed at the acquisition angles, and with intermediate forward projection images at angles between the acquisition angles. A weight factor relates the contribution of each pixel in the X-ray projection images to each sub-volume at each acquisition angle. Synthesized sub-volume projection images are formed according to the calculated weight factors and acquired projection images in each sub-volume. Synthesized sub-volume projection images form synthesized projection images for the full volume image. A second volume image is reconstructed according to the acquired X-ray projection images and the synthesized projection images. The reconstructed second volume image is displayed, stored, or transmitted.

18 Claims, 13 Drawing Sheets

(56) References Cited

U.S. PATENT DOCUMENTS

| | | | | |
|---|---|---|---|---|
| 8,908,950 B2* | 12/2014 | Barfuss | | G06T 11/006 |
| | | | | 382/131 |
| 9,214,028 B2* | 12/2015 | Feilkas | | G06T 7/0089 |
| 9,224,216 B2 | 12/2015 | Zamyatin et al. | | |
| 9,383,587 B2* | 7/2016 | Balogh | | G02B 5/0257 |
| 9,659,390 B2* | 5/2017 | Huo | | G06T 11/005 |
| 9,888,896 B2* | 2/2018 | Lauritsch | | A61B 6/504 |
| 9,965,875 B2* | 5/2018 | Ray | | G06T 11/008 |
| 2005/0152590 A1* | 7/2005 | Thieret | | G06T 11/006 |
| | | | | 382/131 |
| 2009/0207171 A1* | 8/2009 | Feilkas | | G06T 7/0089 |
| | | | | 345/427 |
| 2009/0207969 A1* | 8/2009 | Fischer | | A61B 6/502 |
| | | | | 378/37 |
| 2010/0092063 A1* | 4/2010 | Sakaguchi | | A61B 6/025 |
| | | | | 382/132 |
| 2011/0019890 A1* | 1/2011 | Oikawa | | A61B 6/466 |
| | | | | 382/131 |
| 2011/0168878 A1* | 7/2011 | Hoerndler | | G06T 11/005 |
| | | | | 250/252.1 |
| 2012/0127320 A1* | 5/2012 | Balogh | | G02B 5/0257 |
| | | | | 348/180 |
| 2013/0202171 A1* | 8/2013 | Barfuss | | G06T 11/006 |
| | | | | 382/131 |
| 2014/0086384 A1* | 3/2014 | Wei | | A61B 6/035 |
| | | | | 378/9 |
| 2015/0154765 A1* | 6/2015 | Huo | | G06T 11/005 |
| | | | | 382/132 |
| 2015/0178917 A1* | 6/2015 | Yang | | A61B 6/032 |
| | | | | 382/131 |
| 2015/0190108 A1* | 7/2015 | Li | | A61B 6/022 |
| | | | | 378/41 |
| 2015/0348259 A1* | 12/2015 | Souza | | G06T 7/11 |
| | | | | 382/131 |
| 2016/0034040 A1* | 2/2016 | Wada | | G06F 3/017 |
| | | | | 348/47 |
| 2016/0063694 A1* | 3/2016 | Shi | | G06K 9/4604 |
| | | | | 382/131 |
| 2016/0078647 A1* | 3/2016 | Schildkraut | | G06T 11/005 |
| | | | | 382/131 |
| 2016/0171726 A1* | 6/2016 | Nam | | G06T 11/006 |
| | | | | 382/131 |
| 2016/0278719 A1* | 9/2016 | Jensen | | A61B 6/027 |
| 2017/0039734 A1* | 2/2017 | Langan | | G06T 11/003 |
| 2017/0076458 A1* | 3/2017 | Caulier | | G01B 11/2531 |
| 2017/0270694 A1* | 9/2017 | Vogelsang | | G06T 11/008 |
| 2017/0273641 A1* | 9/2017 | Haque | | A61B 6/03 |
| 2017/0323436 A1* | 11/2017 | Foland | | G06T 7/0002 |
| 2017/0365076 A1* | 12/2017 | Ray | | G06T 11/008 |

OTHER PUBLICATIONS

M. Bertram et al., "Directional View Interpolation for Compensation of Sparse Angular Sampling in Cone-Beam CT", IEEE Transactions on Medical Imaging, vol. 28, No. 7, 2009, pp. 1011-1022.

* cited by examiner

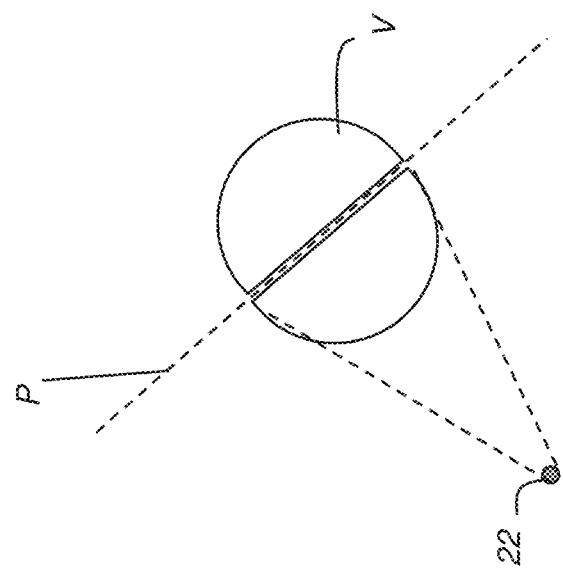
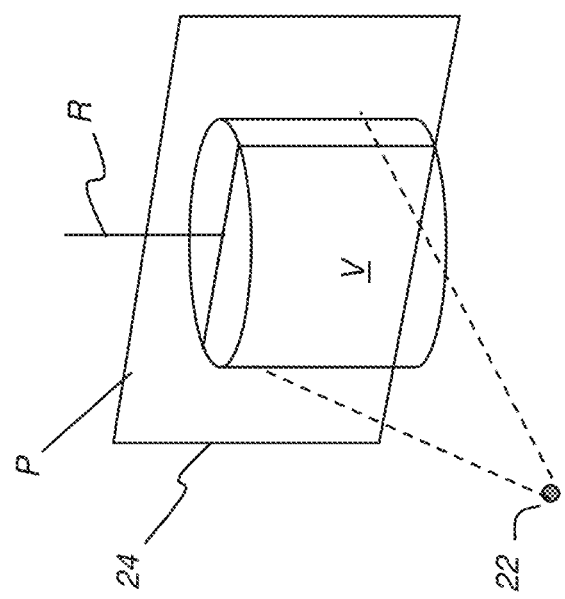
FIG. 6A
FIG. 6B

VOLUME IMAGE RECONSTRUCTION USING PROJECTION DECOMPOSITION

FIELD OF THE INVENTION

The invention relates generally to the field of diagnostic imaging and in particular to radiographic volume imaging and image reconstruction techniques that are directed to reducing aliasing effects and maintaining image quality while reducing the number of projection images obtained.

BACKGROUND OF THE INVENTION

Digital radiographic volume imaging provides three-dimensional (3-D) images that have been reconstructed from a series of 2-D images taken over a succession of angles of the X-ray source relative to the detector. Acquisition of the 2-D projection images used for cone beam CT employs a large-area digital detector, such as a digital radiography (DR) detector that is typically used for conventional single projection radiography.

Computed tomography (CT) systems, such as cone beam computed tomography (CBCT) or cone beam CT systems offer considerable promise as one type of diagnostic tool for providing 3-D volume images. Cone beam CT systems capture volume data sets using a high frame rate flat panel digital radiography (DR) detector and an X-ray source. The X-ray source and detector are typically affixed to a gantry that revolves about the object to be imaged, with the X-ray source directing, from various points along its orbit around the subject, a divergent cone beam of X-rays toward the subject. The CBCT system captures projection images throughout the source-detector orbit, for example, with one 2-D projection image at every angular increment of rotation. The projections are then reconstructed into a 3D volume image using various techniques. Among the most common methods for reconstructing the 3-D volume image are filtered back projection (FBP) approaches.

A factor that affects the quality of volume reconstruction relates to the number of 2-D projection images acquired. Projection images are generally obtained at evenly spaced angular increments; having images at a sufficient number of angles helps to provide enough data to minimize or eliminate aliasing effects such as view aliasing artifacts, typically appearing in the form of regularly spaced streaks, and other image processing problems.

Each projection image, however, requires exposure of the patient. Thus, although having more 2-D projection image data is advantageous for 3-D image reconstruction, it would be preferable to reduce the number of 2-D projection images that are obtained, thereby reducing exposure risks to the patient. In addition, it would be beneficial to reduce the required scan time in order to help reduce image reconstruction problems due to patient motion.

Thus, there would be advantages to volume imaging methods that can obtain sufficient projection image content for accurate volume reconstruction while reducing dosage requirements.

SUMMARY OF THE INVENTION

It is an object of the present disclosure to advance the art of diagnostic 3-D volume imaging. Embodiments disclosed herein offer methods that can help to reduce patient exposure levels for 2-D projection image acquisition without compromising 3-D volume reconstruction results. In particular, the present disclosure seeks to improve methods for volume image reconstruction from projection images by a dynamic partitioning of the image space.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to an embodiment of the present disclosure, there is provided a method for forming an image comprising: reconstructing a full volume image of a subject according to a plurality of X-ray projection images acquired from a digital detector at a plurality of acquisition angles; partitioning the full volume image to form at least a first sub-volume and a second non-overlapping sub-volume; within each partitioned sub-volume, calculating a corresponding set of forward projection images for the sub-volume, wherein members of the corresponding set of forward projection images are computed at angles corresponding to the acquisition angles, and calculating an intermediate set of intermediate forward projection images at angles between the acquisition angles; calculating a weight factor relating to the contribution of each pixel in the plurality of acquired X-ray projection images to each sub-volume at each acquisition angle; forming a plurality of synthesized sub-volume projection images according to the calculated weight factors and the plurality of acquired projection images in each sub-volume; combining the plurality of formed synthesized sub-volume projection images corresponding to each intermediate forward projection angle to form each of a plurality of synthesized projection images for the full volume image; reconstructing a second volume image according to the plurality of acquired X-ray projection images and the plurality of formed synthesized projection images; and displaying, storing, or transmitting a rendering of the reconstructed second volume image.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

FIGS. 6A and 6B show geometric partitioning.

DETAILED DESCRIPTION OF THE INVENTION

Figure 1:
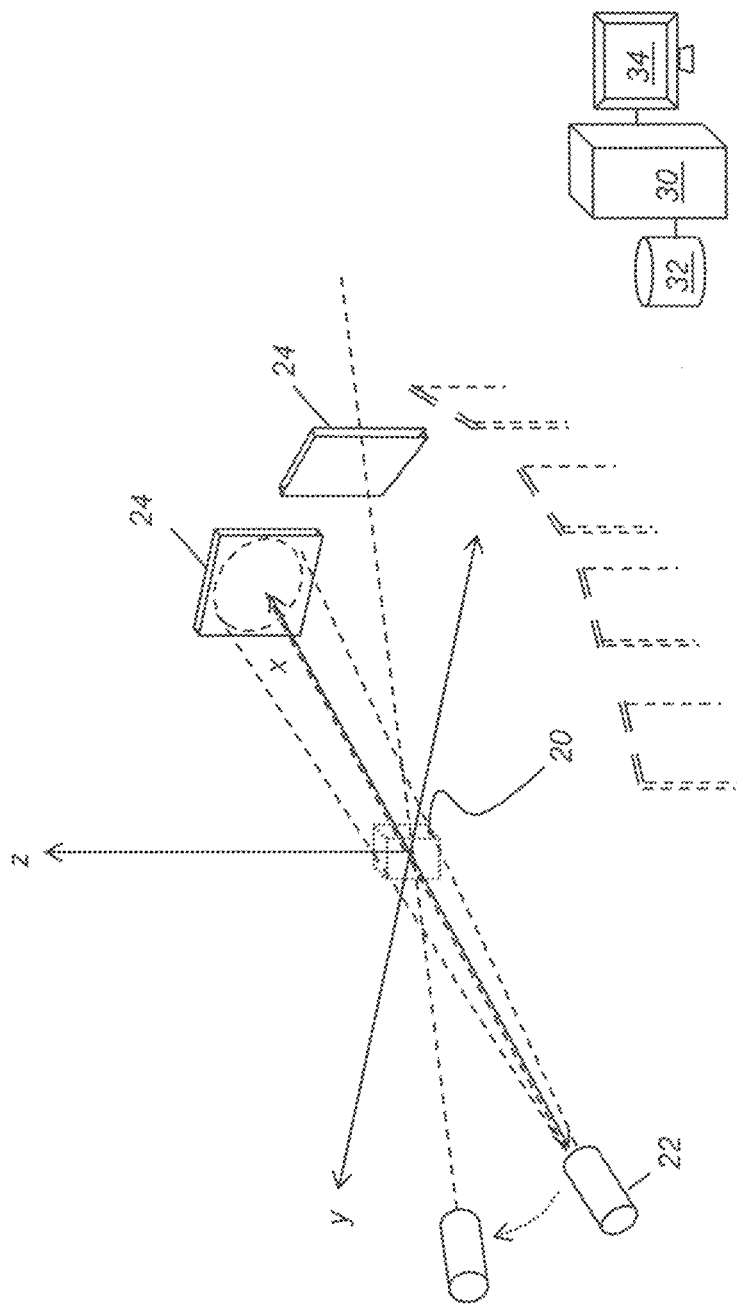
FIG. 1 shows, in schematic form, the scanning activity of a conventional CBCT imaging apparatus.

The following is a detailed description of preferred embodiments of the invention, reference being made to the drawings in which the same reference numerals identify the same elements of structure in each of the several figures.

In the drawings and text that follow, like components are designated with like reference numerals, and similar descriptions concerning components and arrangement or interaction of components already described are omitted. Where they are used, the terms "first", "second", and so on, do not necessarily denote any ordinal or priority relation, but are simply used to more clearly distinguish one element from another.

In the context of the present disclosure, the term "volume image" is synonymous with the terms "3-dimensional image" or "3-D image". Embodiments of the present invention are particularly well suited for suppressing the types of metal artifacts that occur in 3-D volume images, including cone-beam computed tomography (CBCT) as well as fan-beam CT images.

The term "partition" is used herein to indicate a division of a whole into non-overlapping parts. Partition of an imaged volume segments the volume into a number of non-overlapping portions.

The mathematical definition of a cylinder includes not only the familiar right circular cylinder, but any number of other shapes whose outer surface can be traced out by moving a straight line parallel to a fixed straight line, wherein the moving straight line intersects a fixed planar closed curve or base.

In the image processing context of the present disclosure, "rendering" is the active process of generating and forming an image for display and generating the pattern of signals needed for displaying it to a user. Image data content that is used for rendering can be transformed from a 2-D or 3-D model (or models), typically stored as scene content in some type of scene file, into suitable patterns of light energy that are emitted from a display screen. A scene file contains objects in a strictly defined language or data structure, describing aspects of the image content such as geometry, viewpoint, texture, lighting, and shading information as a description of a scene. The data contained in the scene content or scene file is passed to a rendering program to be processed and output or streamed to a display driver or graphics processing unit (GPU) for direct presentation on a display or to a digital image or raster graphics image file. The digital image data file can alternately be available for presentation on a display. In general, the term "rendering" provides a transformation that can be considered as analogous to an "artist's rendering" of a scene; different artists working in different media can generate different renderings of the same scene content. The same image content can be rendered, for example, on a monochrome display or in color on a full color display.

The term "modality" is a term of art that refers to types of imaging. Modalities for an imaging system may be conventional X-ray radiography, fluoroscopy or pulsed radiography, tomosynthesis, tomography, ultrasound, MRI, or other types of imaging. The term "subject" refers to the patient who is being imaged and, in optical terms, can be considered equivalent to the "object" of the corresponding imaging system.

The term "set", as used herein, refers to a non-empty set, as the concept of a collection of elements or members of a set is widely understood in elementary mathematics. The terms "subset" or "partial subset", unless otherwise explicitly stated, are used herein to refer to a non-empty proper subset, that is, to a subset of the larger set, having one or more members. For a set S, a subset may comprise the complete set S. A "proper subset" of set S, however, is strictly contained in set S and excludes at least one member of set S. A "partition of a set" is a grouping of the set's elements into non-empty subsets so that every element is included in one and only one of the subsets. Two sets are "disjoint" when they have no element in common.

With respect to an image detector, the term "pixel" refers to a picture element unit cell containing a photo-conversion circuit and related circuitry for converting incident electromagnetic radiation to an electrical signal. For the image processing steps described herein, the terms "pixels" for picture image data elements, conventionally used with respect 2-D imaging and image display, and "voxels" for volume image data elements, often used with respect to 3-D imaging, can be used interchangeably.

It should be noted that the 3-D volume image is itself generated from image data obtained as pixels on a 2-D sensor array and displays as a 2-D image from some angle of view. Thus, 2-D image processing and image analysis techniques can be applied to the 3-D volume image data. In the description that follows, techniques described as operating upon pixels may alternately be described as operating upon the 3-D voxel data that is stored and represented in the form of 2-D pixel data for display. In the same way, techniques that operate upon voxel data can also be described as operating upon pixels.

In the context of the present disclosure, "volume imaging" refers to volume radiographic imaging modalities such as, but not limited to, computed tomography (CT) and/or tomosynthesis imaging. Volume imaging methods form a volume 3-D image of a subject that can be viewed as a planar slice or plane section taken at a specified depth and angle. As noted previously, volume imaging obtains 3-D depth information by changing the relative angle between the X-ray source and the subject for each 2-D projection image that is acquired during scanning.

In the context of the present disclosure, the phrase "in signal communication" indicates that two or more devices and/or components are capable of communicating with each other via signals that travel over some type of signal path. Signal communication may be wired or wireless. The signals may be communication, power, data such as image data, or energy signals. The signal paths may include physical, electrical, magnetic, electromagnetic, optical, wired, and/or wireless connections between the first device and/or component and second device and/or component. The signal paths may also include additional devices and/or components between the first device and/or component and second device and/or component.

Reference is hereby made to an article by Bertram, Wiegert, Schafer, Rose, and Aach entitled "Directional View Interpolation for Compensation of Sparse Angular Sampling in Cone Beam CT" in *IEEE Transactions on Medical Imaging* Vol. 28, No. 7, July 2009, pp. 1011-1022, incorporated herein in its entirety.

Reference is hereby made to U.S. Pat. No. 7,602,879 (Chen et al.) and U.S. Pat. No. 9,224,216 (Zamyatin at al), both of which are incorporated herein in their entirety.

CBCT imaging apparatus and the imaging algorithms used to obtain 3-D volume images using such systems are well known in the diagnostic imaging art and are, therefore, not described in detail in the present application. Some exemplary algorithms and approaches for forming 3-D volume images from the source 2-D images, projection images that are obtained in operation of the CBCT imaging apparatus can be found, for example, in the disclosure of U.S. Pat. No. 5,999,587 entitled "Method of and System for Cone-Beam Tomography Reconstruction" to Ning et al. and U.S. Pat. No. 5,270,926 entitled "Method and Apparatus for Reconstructing a Three-Dimensional Computerized Tomography (CT) Image of an Object from Incomplete Cone Beam Data" to Tam, both of which are incorporated herein in their entirety.

Embodiments of the present invention can be readily adapted to the particular geometry of the CBCT or other volume imaging apparatus. In particular, an extremity imaging apparatus can generate volume images suitable for application of methods described herein.

Embodiments of the present disclosure provide approaches for reducing patient exposure and reducing artifacts by acquiring only a partial percentage of the N+M X-ray projection images that would otherwise be needed to for artifact-free reconstruction. Then, to obtain an ordered set of projection images that is sufficient to be used for tomographic reconstruction, a number of synthesized projection images M is generated and added to the acquired set of N projection images. This forms a larger set of N+M projection images, effectively providing a reduced angular spacing $\Delta\alpha'$ between adjacent projection images in the sequence used for reconstruction. The result is an enhanced 3-D reconstruction that can be substantially artifact-free.

In typical applications, a computer or other type of dedicated logic processor for obtaining, processing, and storing image data is part of the CT or CBCT system, along with one or more displays for viewing image results. A computer-accessible memory is also provided, which may be a memory storage device used for longer term storage, such as a device using magnetic, optical, or other data storage media. In addition, the computer-accessible memory can comprise an electronic memory such as a random access memory (RAM) that is used for shorter term storage, such as employed to store a computer program having instructions for controlling one or more computers to practice the method according to the present invention.

In order to more fully understand the methods of the present invention and the problems addressed, it is instructive to review principles and terminology used for CBCT image capture and reconstruction. Referring to the perspective view of FIG. 1, there is shown, in schematic form and using enlarged distances for clarity of description, the activity of a conventional CBCT imaging apparatus for obtaining the individual 2-D images that are used to form a 3-D volume image. A cone-beam radiation source 22 directs a cone of radiation toward a subject 20, such as a patient or other subject. A sequence of images is obtained in rapid succession at varying angles about the subject, such as one image at each 1-degree angle increment in a 200-degree orbit. A DR detector 24 is moved to different imaging positions about subject 20 in concert with corresponding movement of radiation source 22. FIG. 1 shows a representative sampling of DR detector 24 positions to illustrate how these images are obtained relative to the position of subject 20. Once the needed 2-D projection images are captured in this sequence, a suitable imaging algorithm, such as filtered back projection (FBP) or other conventional technique, is used for generating the 3-D volume image. Image acquisition and program execution are performed by a computer 30 or by a networked group of computers 30 that are in image data communication with DR detectors 24. Image processing and storage is performed using a computer-accessible memory 32. The 3-D volume image can be presented on a display 34.

FBP is a discrete implementation of an analytic model that assumes that CT transmission measurements are linear functions of the attenuation line integrals along the corresponding primary photon trajectories through the subject and are noiseless. When scanning subjects comprised of anatomically native materials under normal conditions, relatively simple corrections to the raw projection data are sufficient to assure that these assumptions (i.e. linear relationship) are at least approximately true. This treatment allows acquisition and accurate volume reconstruction without visually observable artifacts.

In the image processing context of the present disclosure, "rendering" is the active process of generating and forming an image for display and generating the pattern of signals needed for displaying it to a user. Image data content that is used for rendering can be transformed from a 2-D or 3-D image model (or models), typically stored as scene content in some type of scene file, into suitable patterns of light energy that are emitted from a display screen.

Embodiments of the present disclosure provide approaches for reducing patient exposure and reducing artifacts by acquiring a number N of actual projection images that represents only a partial percentage of the full number (N+M) of X-ray projection images that would otherwise be needed to for artifact-free reconstruction. Then, to obtain an ordered set of projection images that is sufficient to be used for tomographic reconstruction, a number of synthesized projection images M are generated and added to the acquired set of N projection images. This forms a larger set N+M of projection images, effectively providing a reduced angular spacing $\Delta\alpha'$ between adjacent projection images in the sequence used for reconstruction. The result is an enhanced 3-D reconstruction that can be substantially artifact-free.

It should be noted that the number M of synthesized projection images that is generated can be smaller than, equal to, or even larger than the number N of actual X-ray projection images. Examples given following show generation of a single synthesized image M corresponding to an angle midway between the corresponding angles of first and second adjacent X-ray projection images n and (n+1); the image obtained at this midway angle is represented herein using the notation n.5. Thus, in the examples shown here, M<N. However, multiple synthesized images M can be generated for angles between any two adjacent X-ray projection images n and (n+1). For example, using the same processing approach, two synthesized images M can be generated between any two adjacent X-ray projection images n and (n+1).

Generating and Using Synthetic Images

An embodiment of the present disclosure provides a method for improving reconstruction results without additional exposure to the patient by generating synthesized images that are formed using partitioning, forward projection, and an image data mapping sequence. The synthetic images can then be used to supplement the image content provided from actual acquired projection images without additional exposure to the patient.

Figure 2:
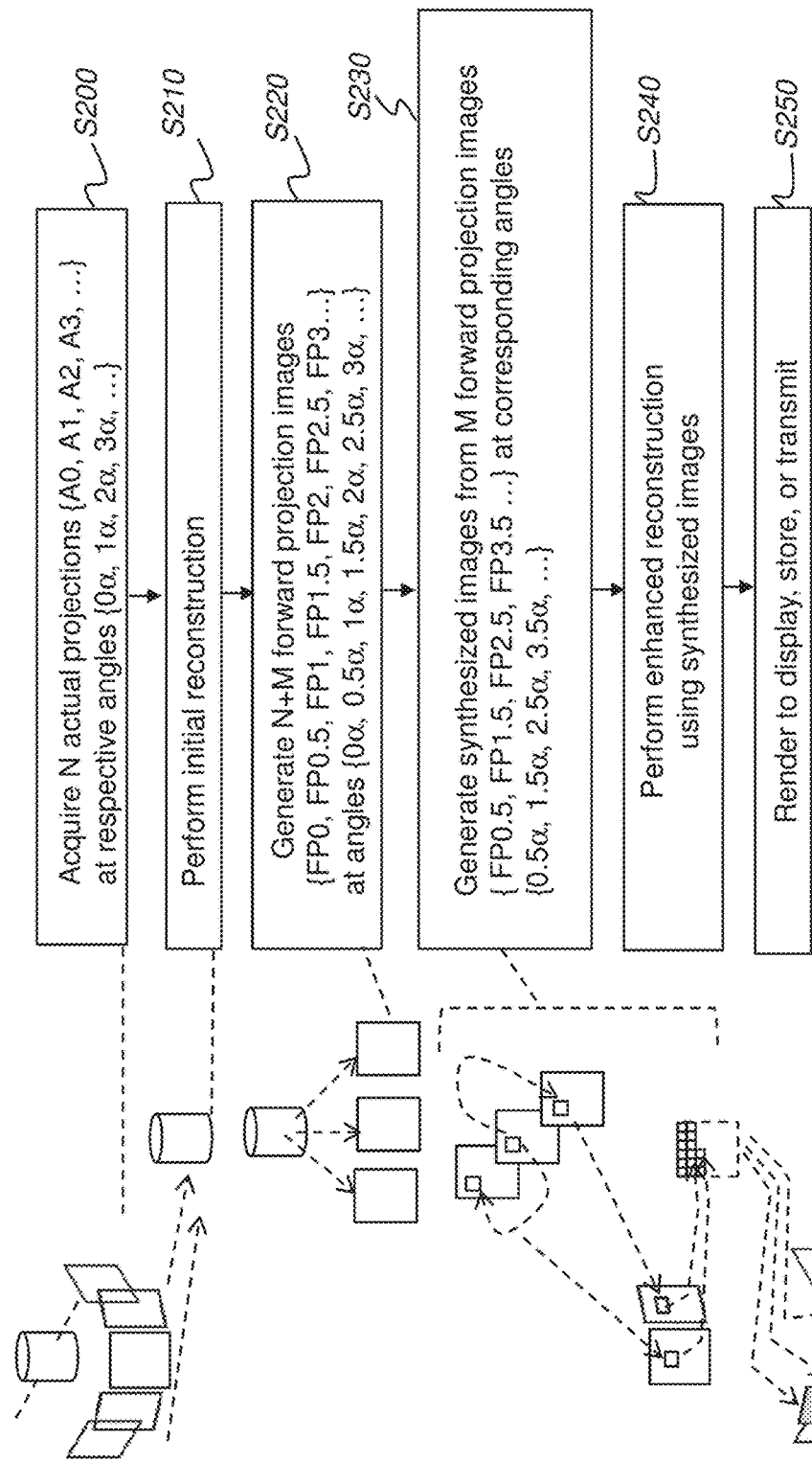
FIG. 2 is a logic flow diagram showing a sequence for enhanced 3D reconstruction.

FIG. 2 is a logic flow diagram showing an overview of the sequence for forming and using synthetic images for enhanced volume reconstruction. In an acquisition step S200, an ordered set having a number N of actual X-ray projection images {A0, A1, A2, A3, . . . }, termed the "acquired" images in the context of the present disclosure, is obtained. Each X-ray projection image in the set is acquired at one of a corresponding sequence of N capture angles α as indicated in FIG. 1. The ordered set of N acquired X-ray projection images can be considered ordered according to acquisition angle. In practice, X-ray projection images can be acquired in any order with respect to angle; the ordered set structure is convenient arrangement for showing the acquisition sequence and for illustrating the processing that follows, used to generate synthesized images.

In the example process shown in FIG. 2, every acquired X-ray projection image An has a corresponding capture angle $α_n$ and is adjacent to a previous acquired X-ray projection image (n−1) with corresponding capture angle $α_{n-1}$ and to a subsequent or following acquired X-ray projection image (n+1) with corresponding capture angle $α_{n+1}$. Angular spacing between any two adjacent acquired X-ray projection images An in the sequence can be expressed as Δα and can be at equal intervals. From the ordered set of acquired projection images, an initial reconstruction step S210 forms a 3-D volume image using an analytic reconstruction method such as filtered back projection (FBP), or using an iterative reconstruction process, or using some other suitable reconstruction algorithm.

In order to generate an expanded set of projection images for reconstruction, the procedural sequence of FIG. 2 performs a forward projection step S220 that generates an intermediate set of N+M forward projection images, shown in FIG. 2 and described herein as {F0, F0.5, F1, F1.5, F2, F2.5, F3 . . . } at corresponding angles {0 α, 0.5 α, 1 α, 1.5 α, 2 α, 2.5 α, 3α, . . . }. As described previously, the notation using "0.5" indicates angles between the acquisition angles α, such as half-way between. Forward projection thus generates projection images at each of the angles α corresponding to the N actual X-ray projections and adds M additional projection images at intermediate angles, such as at angles n.5 α, half-way between the original angles α. It should be emphasized that the intermediate angles can be at other than half-way between acquisition angle, such as at ⅓ intervals or at some arbitrary angular offset between the nearest acquired images.

Continuing with the FIG. 2 sequence, the process then proceeds to re-build a set of M synthesized projection images {S0.5, S1.5, S2.5, S3.5, . . . } using the M added projection images as templates in a synthesized image generation step S230. A sequence for generating the synthesized images using decomposition or partitioning of the volume is described in more detail subsequently.

To continue the sequence of FIG. 2, a final reconstruction step S250 executes, generating an enhanced 3-D volume reconstruction using the original acquired X-ray projection images {A0, A1, A2, A3, . . . } supplemented by the set of synthesized images {S0.5, S1.5, S2.5, S3.5, . . . } that have been formed using the process described subsequently. The final reconstruction step S240 thus uses the combined set {A0, S0.5, A1, S1.5, A2, S2.5, A3, S3.5, . . . } for forming the enhanced 3-D reconstruction. The data can then be displayed, rendered for viewing in a display step S250. For step S250, rendering relates to the selection, processing, and display of a particular 2-D view of the reconstructed 3-D image scene content.

Figure 3A:
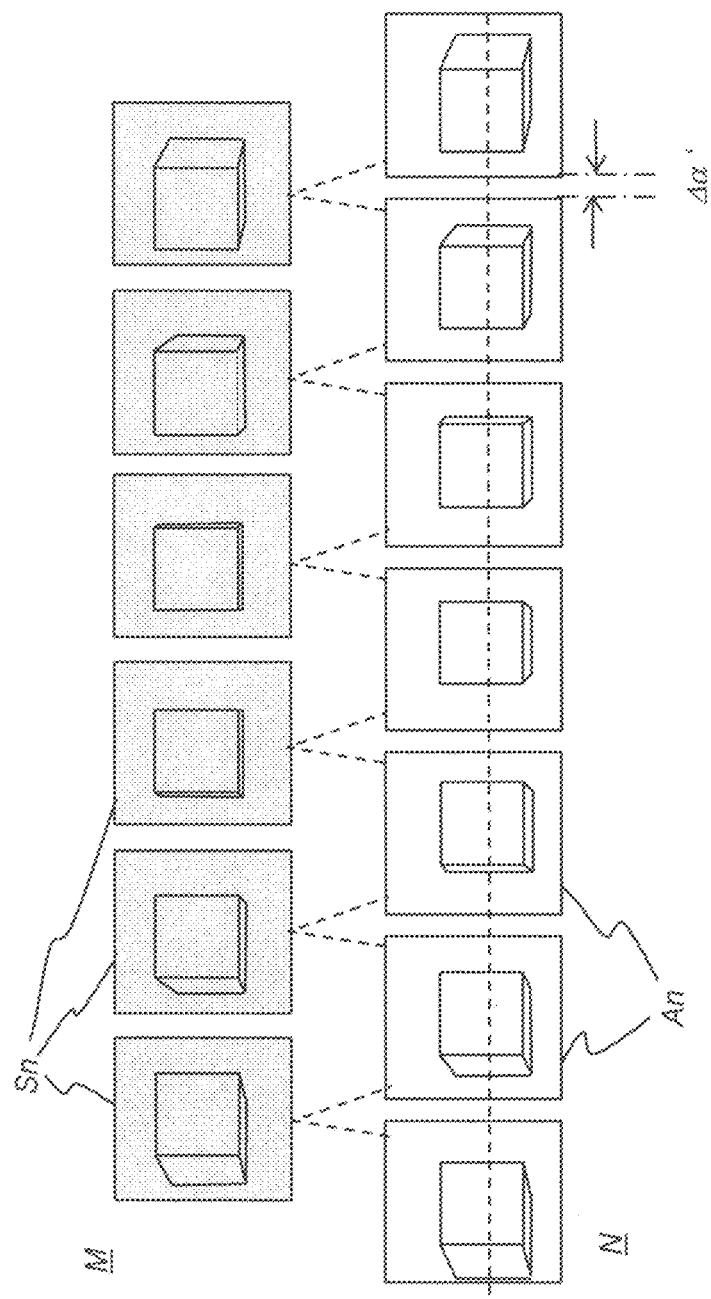
FIGS. 3A and 3B are schematic diagrams illustrating a detailed sequence for enhanced 3-D volume reconstruction using synthetic images.

FIG. 3A is a schematic diagram that shows supplementing the ordered set of N acquired X-ray projection images An with a set of M synthesized images Sn.

Figure 3B:
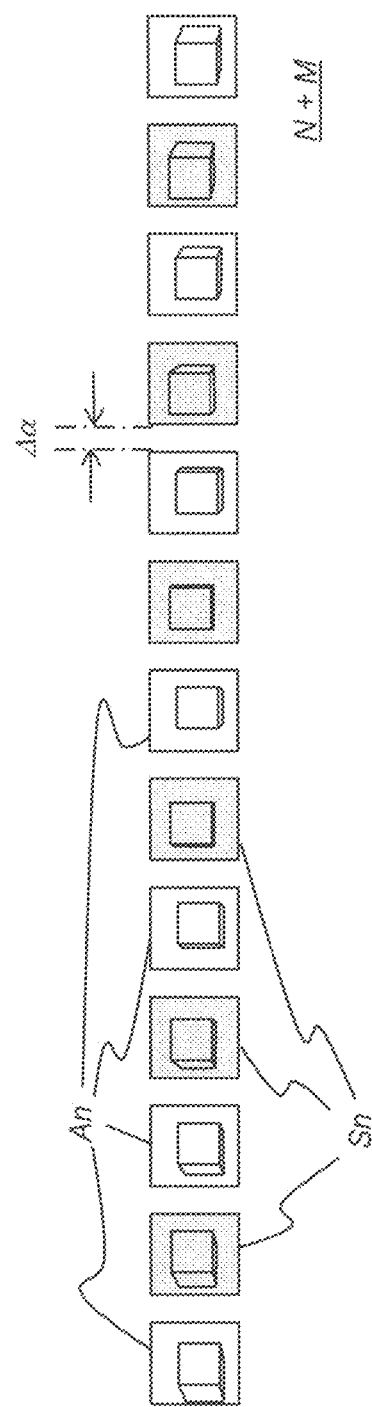

FIG. 3B is a schematic diagram that show's a combined set of acquired X-ray and synthesized images used for volume image reconstruction.

Partitioning the Volume Space

While the process described with reference to FIGS. 2-3B provides suitable image content for volume reconstruction with reduced exposure to the patient, there is room for improvement. One inherent difficulty that impacts volume reconstruction relates to relative movement of volume content in different directions.

Figure 4B:
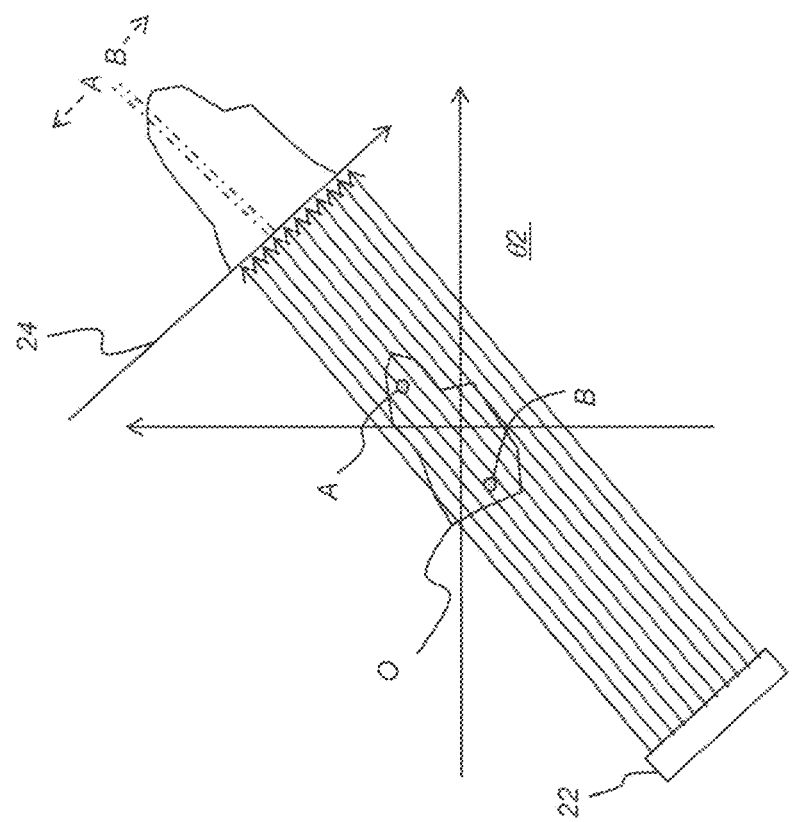
FIGS. 4A and 4B show projections using a ray-trace approach.
Figure 4A:
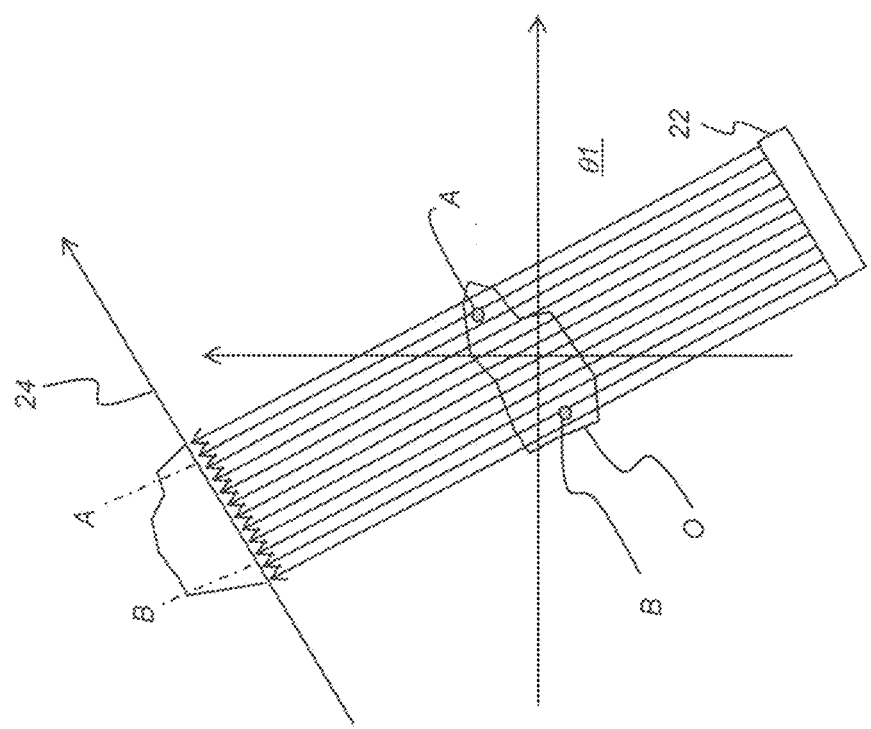

FIG. 4A schematically shows, as a top view, a simplified model used to describe the Radon transform and the resulting sinogram that is obtained by combining successive images, each representative of the amount of energy that passes through object O onto detector 24. FIG. 4A shows the transform portion obtained for a projection image acquired at an angle of θ1. FIG. 4B shows the transform portion that is obtained at angle θ2. As shown in FIGS. 4A and 4B, rotation of the radiation source 22 and detector 24 from angle θ1 to θ2 changes the relative positions of points A and B in the sequence of projection images that are acquired. As the source 22/detector 24 pair rotates from angle θ1 to θ2, the radiation energy for point A appears to move toward the left. Conversely, as the source 22 moves over the same angular range, point B appears to move toward the right. At angles near θ2, the image data from points A and B are moving in different directions relative to the projection images captured at detector 24. This change in spatial relationship for the obtained data, varying with the location of anatomy relative to the rotational geometry of the CT or CBCT scan, can complicate the task of volume image reconstruction, since different portions of the anatomy shift in position in different directions and at different rates from one projection image to the next.

Figure 5:
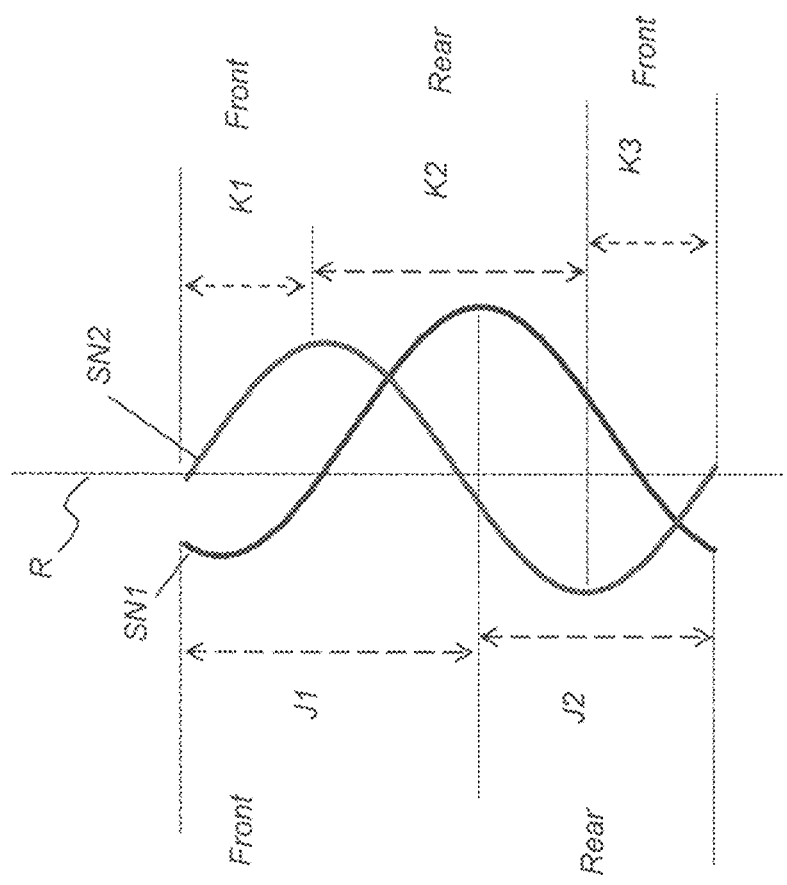
FIG. 5 shows sinogram curves for volume image content.

FIG. 5 shows the changing spatial relationships between two imaged points, such as those described with reference to FIGS. 4A and 4B, in a sinogram view. For this view, the sinogram can be considered as a stacked collection of projections of a single slice of the subject, viewed from the side. The rotation axis is designated as R. The sinogram SN1 for a first object point shows that the first object point is at the front of each projection, and moving in one direction, for angles over the range indicated J1 and at the back of each projection, moving in the opposite direction, for angles in the range J2. Sinogram SN2 for a second object point shows that the second object point is at the rear of each projection, and moving in one direction for angles over the range indicated K1 and at the back of each projection over the range of angles K2. Over the range of angles K3, the second object point is once again at the front of each projection.

At least one embodiment of the present disclosure addresses the difficulties that are inherent to the scan geometry, as described with reference to FIGS. 4A-5, by using a geometric partitioning of the volume space. For geometric partitioning, the positions of the X-ray source and detector relative to the subject volume are considered and the volume is partitioned to help compensate for the relative movement conflicts noted with reference to FIGS. 4A, 4B, and 5.

Referring to the perspective view of FIG. 6A and top view of FIG. 6B, one partitioning approach divides the volume in half for each relative position of the source and detector.

That portion of the imaged volume V that is forward of the central axis of rotation with reference to the source, and is defined by a bisecting plane P that is orthogonal to a central ray of illumination, forms one partial sub-volume. The portion of the imaged volume that lies behind the bisecting plane P is a second partial sub-volume for the projection images at that angle. In the geometric partitioning logic, the partial sub-volume varies at each projection angle.

Partitioning can also address difficulties with various types of image content. Another type of partitioning that can be applied to the volume and used herein relates to voxel content or density data value for the imaged object. With this object-based partitioning approach, the partitioning is static, so that the same voxels occupy each sub-volume for every source-to-detector acquisition angle. Thus, for example, metal content can form a sub-volume for separate forward projection processing. Other known components, such as bone or soft tissue, can similarly be used to define sub-volumes. A static partitioning defines a fixed portion of the imaged volume, which can include any imageable portion of the object space, the cylindrical volume that lies between the source and detector as they orbit the subject.

In the partitioning sequence, a weight can be computed for each calculated signal needed to form the forward projection images Fn. According to an embodiment that uses geometric partitioning with two partitions as shown in FIGS. 6A and 6B, a front and rear weight are generated for each pixel:

$$FrontWeight = \frac{FrontProjection}{FrontProjection + RearProjection} \times Actual$$

$$RearWeight = \frac{RearProjection}{FrontProjection + RearProjection} \times Actual$$

The front and rear partitions can then be individually identified and processed using the computed weights.

In order to simplify discussion, the description given herein is directed to embodiments in which only two partitions are generated. However, it should be noted that partitioning can generate two or more sub-volumes for the imaged content and that similar processing applies for each of two or more sub-volumes.

The calculated weight values are then used to determine how each pixel value is assigned relative to the partitioning.

Using Partitioning when Generating Synthetic Images

An embodiment of the present disclosure provides a method for improving reconstruction results without additional exposure to the patient using the synthetic image generation process described with reference to FIGS. 2-3B along with volume decomposition or partitioning as described above and with reference to FIGS. 4A-6B.

Figure 7:
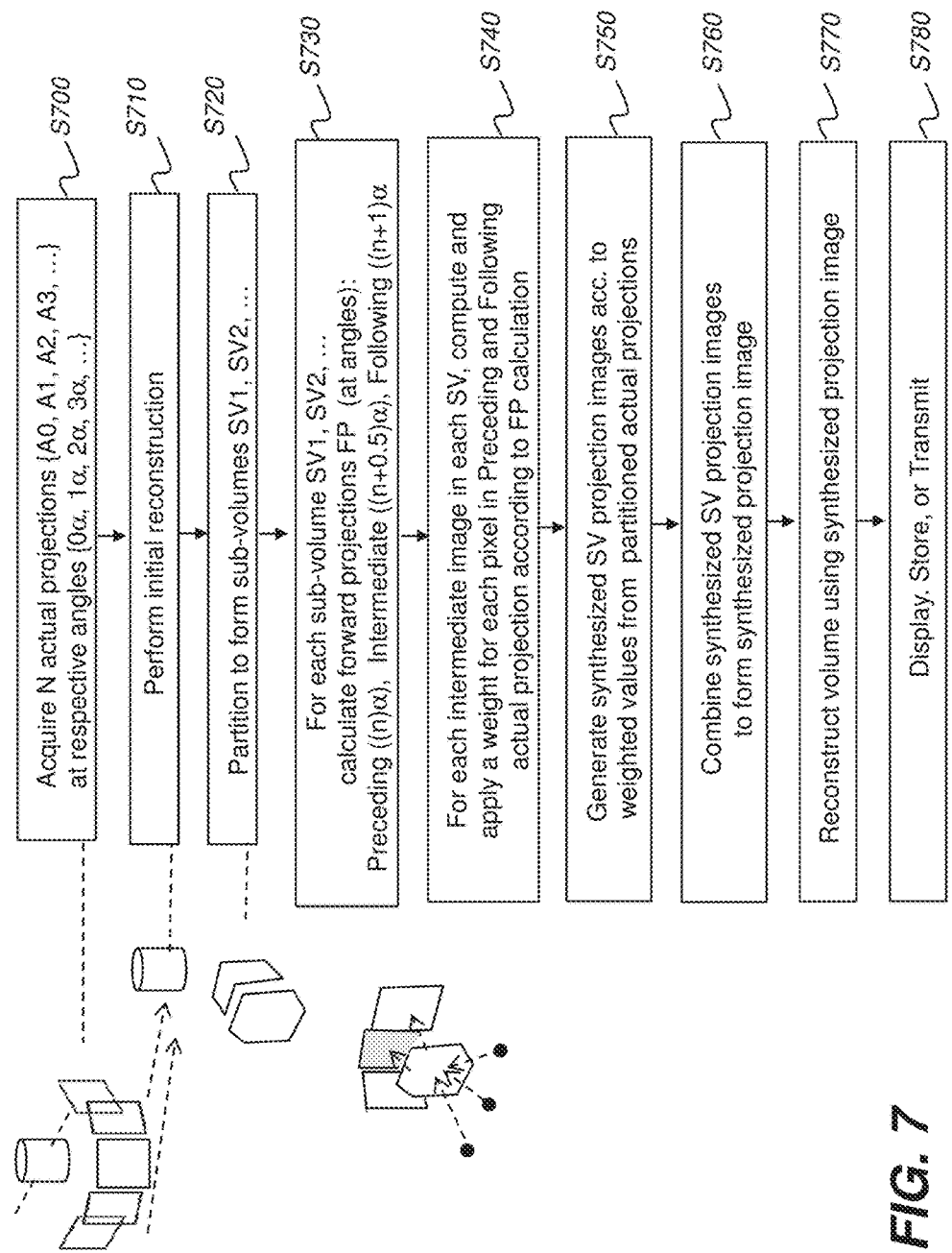
FIG. 7 shows a logic flow diagram using volume decomposition.
Figure 8:
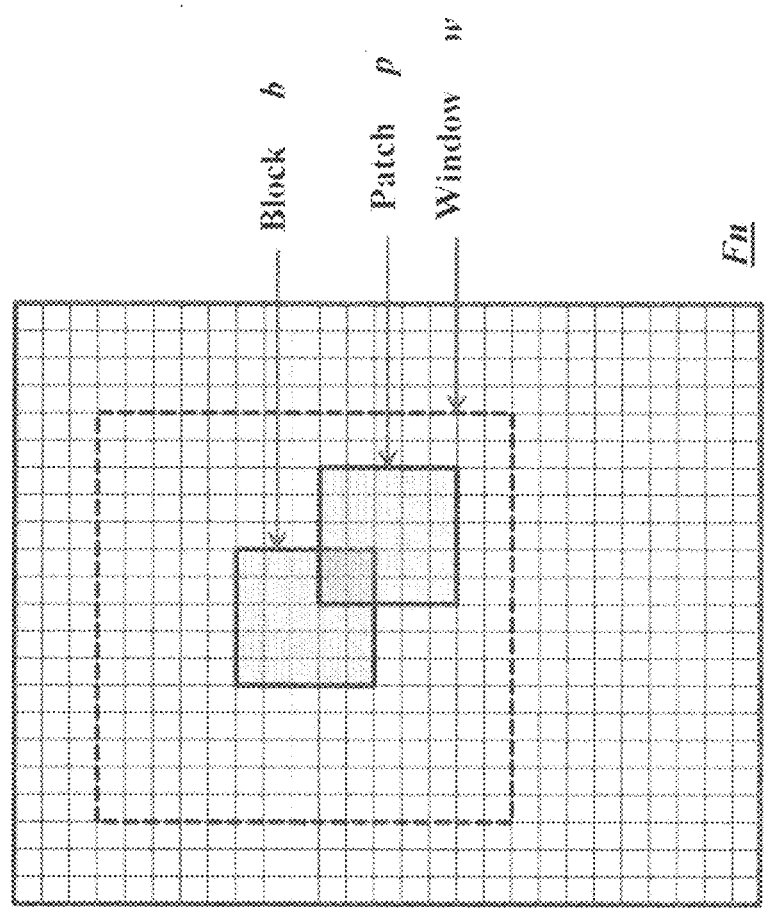
FIG. 8 shows an exemplary window that defines a search area.

The logic flow diagram of FIG. 7 shows a sequence for volume image reconstruction using partitioning. In an acquisition step S700, an ordered set having a number N actual X-ray projection images {A0, A1, A2, A3, ... }, termed the "acquired" images in the context of the present disclosure, is obtained. Each X-ray projection image in the set is acquired at one of a corresponding sequence of N capture angles α as indicated in FIG. 1. The ordered set of N acquired X-ray projection images can be considered ordered according to acquisition angle. In practice, X-ray projection images can be acquired in any order with respect to angle; the ordered set structure is convenient arrangement for showing the acquisition sequence and for illustrating the processing that follows, used to generate synthesized images.

In the example process shown in FIG. 7, every acquired X-ray projection image An has a corresponding capture angle $α_n$ and is adjacent to a previous acquired X-ray projection image A(n−1) with corresponding capture angle $α_{n-1}$ and to a subsequent or following acquired X-ray projection image A(n+1) with corresponding capture angle $α_{n+1}$. Angular spacing between any two adjacent acquired X-ray projection images An in the sequence can be expressed as Δα. From the ordered set of acquired projection images, an initial reconstruction step S710 forms a full 3-D volume image using filtered back projection (FBP), using an iterative reconstruction process, or using some other suitable reconstruction algorithm.

A partitioning step S720 then applies partitioning logic to the full 3-D volume define a set of two or more sub-volumes {SV1, SV2, ... }. The sequence of FIG. 7 shows processing for the complete partition of the volume, with a number p of sub-volumes. As noted previously, sub-volumes SVn can be defined using geometry of the scanning operation or using structural or content data from the reconstructed object itself.

Continuing with the FIG. 7 sequence, within each sub-volume SVp, a forward projection step S730 generates forward projection images at angles $α_n$ corresponding to the acquisition angles used for the actual X-ray projection images. In addition, step S730 also generates a set of intermediate forward projection images, at angles between each angle $α_n$ and its respective, adjacent following angle $α_{n+1}$. Intermediate forward projection images are represented at angles (n+0.5) midway between preceding and following forward projections; as noted earlier, the intermediate forward projections can be calculated at other angular positions between angle $α_n$ and its respective, adjacent following angle $α_{n+1}$.

A weighting step S740 then calculates and applies a weight or weighting factor to each pixel value for the corresponding acquired image data that contributes to the sub-volume. The weighting factor is an estimate of the proportionate contribution of each acquired pixel of the sub-volume to the computed forward projection value and is based on the proportion of pixel values in the sub-volume to the total data value obtained for that pixel at the corresponding acquisition angle. A synthesized sub-volume projection calculation step S750 then uses the weighted values from step S740 to generate a synthetic projection image for each sub-volume accordingly. A combination step S760 combines the synthetic projection image results for the corresponding angle from each sub-volume to form a synthesized projection image for subsequent volume reconstruction, forming a set of M synthesized projection images, using the variable notation described previously. A reconstruction step S770 performs volume reconstruction using the initial set of N acquired projection images (corresponding to the N actual acquisition angles {0α; 1 α, 2 α, 3 α, ... } plus the M synthesized projection images (corresponding to acquisition angles between the set of N actual acquisition angles). A display step S780 then allows display, storage, and transmission of the volume image data, as well as display, storage, and transmission of one or more of the synthetic projection images formed using the FIG. 7 process.

Figure 9B:
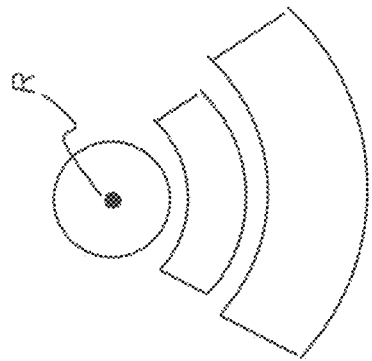
FIGS. 9A, 9B, and 9C show exemplary geometric partitioning schemes.
Figure 9C:
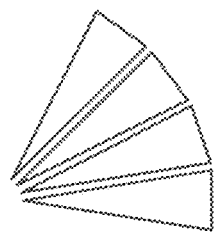
Figure 9A:
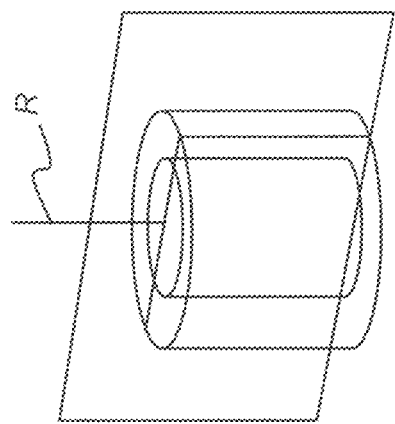

By way of illustration, the examples given herein show partitioning using front and rear segments of the volume image space; however, other partitioning models can be applied. Some of the alternate partition models are shown in FIGS. 9A-9C. FIG. 9A shows additional segments defined within the reconstructed volume. FIG. 9B shows a top view of a partition based on relative rate of change for volume content according to distance from rotation axis R. FIG. 9C shows a wedged partition of the volume. The same processing described for partitioning into front and rear portions, as described with reference to FIGS. 6A and 6B, can be used for the geometric partitioning shown in FIGS. 9A-9C or for other geometric partitioning arrangements that define a partition having non-overlapping sub-volumes.

It should be noted that various image conditioning processes can be applied to the volume data that is used for forward projection as well as for any of the generated forward projection or synthesized image data. Image conditioning improves the appearance of a projection image or of a synthesized image and can be applied as part of display rendering in order to change image sharpening or blurring, such as to improve image patch identification and processing, for example. Image conditioning such as metal artifacts reduction can be applied to the original acquired X-ray projection images or to the volume data that is reconstructed from the original X-ray projection images.

Figure 10:
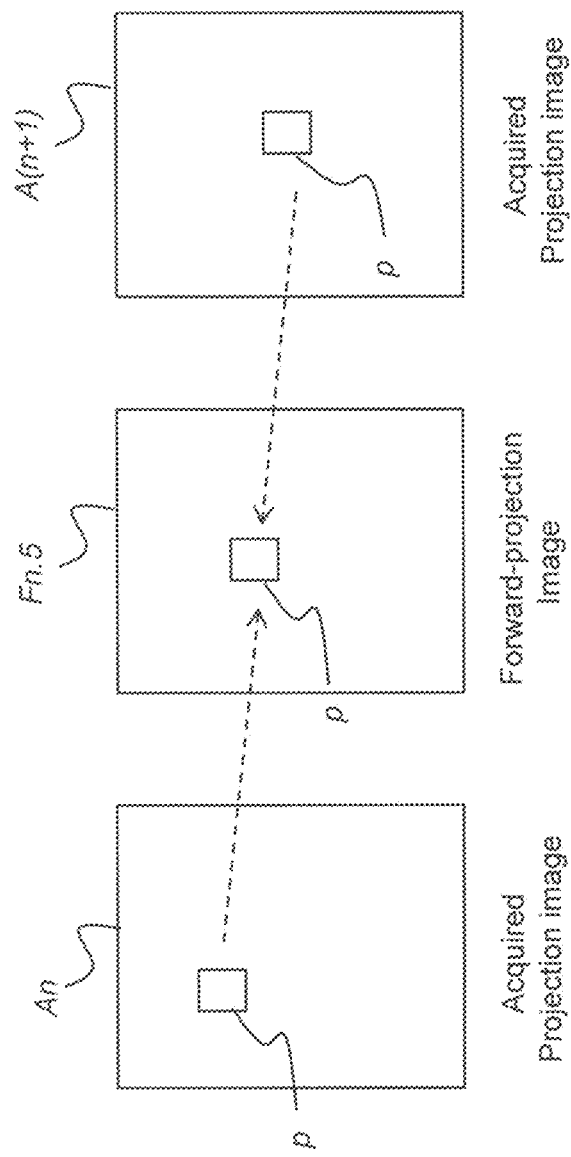
FIG. 10 shows the generation of a forward projection signal data using partitioning according to an embodiment of the present disclosure.

FIG. 10 shows mapping and combining patch content for a candidate patch from two adjacent acquired X-ray projection images to form patch p on an intermediate image designated Fn.5 using forward projection, in order to form synthesized image Sn.5 at completion of this processing.

Seam Smoothing

A synthesized image constructed using the method described herein can be formed as a mosaic of patches. Often, boundaries or seams between patches are readily discernable, causing perceptible degradation in the final reconstruction volume. One method to correct for seams is to perform a one dimensional smoothing filter across the seams. If the filter is applied uniformly, however, some sharp edges are overly smoothed and clash with the actual images.

According to a method of the present disclosure, seam smoothing is executed with respect to the forward projected image. The synthesized image seams are smoothed by applying the following one directional algorithm vertically and horizontally:

(i) Identify adjacent pixels p1 and p2, each belonging to a different block.

(ii) Calculate the difference ΔSyn of the two pixels, p1 and p2.

(iii) Calculate the difference ΔAct, of pixels in the same location in the forward projected image.

(iii) Compare ΔSyn, and ΔAct. If |ΔSyn|<|ΔAct|, then make no change to pixel values; otherwise add one-third of the difference to p1 and remove one third of the difference from p2.

The approach outlined above can help to dampen the seam boundary adaptively and limit image degradation that can otherwise occur with a global smoothing approach.

Figure 11:
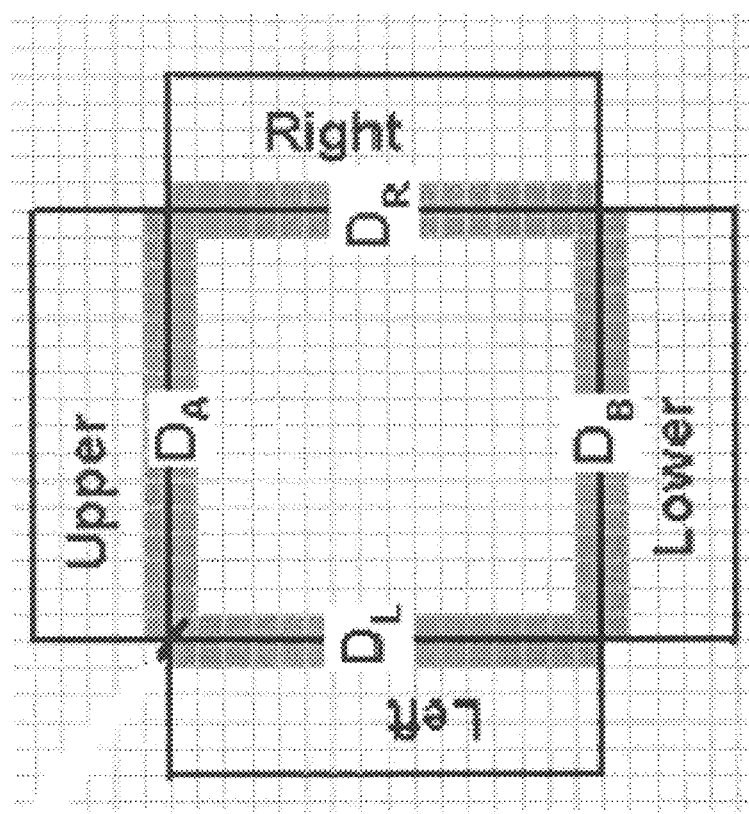
FIG. 11 illustrates the meaning of boundary matching terms.

To help mitigate blocking artifacts, the Applicants can alternately use an improved spatial similarity metric, formed by adding terms that encourage spatial correlation with neighboring patches. This includes two types of terms: a boundary matching energy and a flow field smoothing energy. FIG. 11 shows the meaning of boundary matching terms $D_A$, $D_R$, $D_B$, $D_L$, used herein.

The basic energy relationship E can be expressed as follows:

$$E = \text{block matching energy} + \text{boundary matching energy} + \text{flow field smoothing energy} \quad \text{Equation (1)}$$

Block matching energy can then be formulated as follows:

$$E_{blockmatching} = \sum_{(x,y) \in S(B)} |f_{left}(x-u, y-v) - f_{right}(x+u, y+v)| \quad \text{Equation (2)}$$

A flow field term expresses the consistency of flow direction:

$$E_{flow\,field} = \sum_{i \in neighbors} |(u - u_i)| + |v - v_i| \quad \text{Equation (3)}$$

where, as shown in FIG. 11:

$$\text{neighbors} = \{\text{upper, lower, left, right}\} \quad \text{Equation (4):}$$

$$E_{boundary\,matching} = D_A + D_B + D_L + D_R \quad \text{Equation (5):}$$

$$D_A(u, v) = \sum_{x=0}^{N-1} |0.5(f_{left}(x-u, y-v) - f_{right}(x+u, y+v)) - f^{k-1}(x, y-1)| \quad \text{Equation (6)}$$

Embodiments of the present disclosure provide an improvement over earlier interpolation methods, particularly with respect to reduction of artifacts in general, particularly view aliasing artifacts.

Figure 12B:
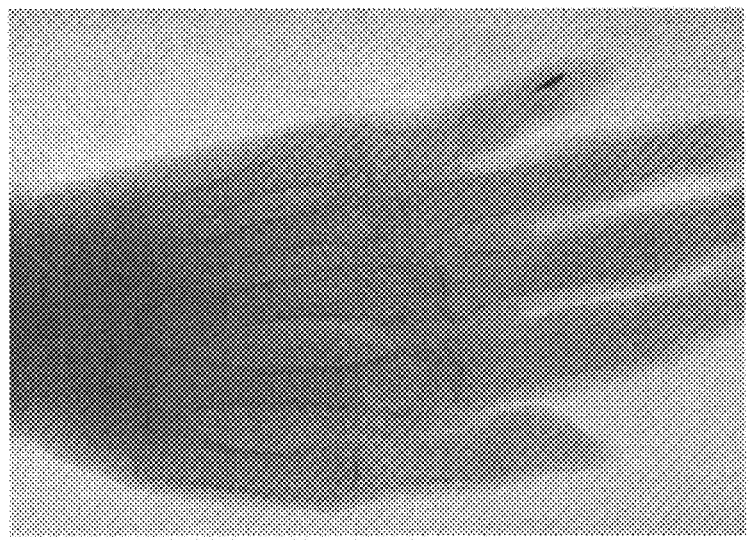
FIG. 12B shows a synthesized projection image generated according to an embodiment of the present disclosure.
Figure 12A:
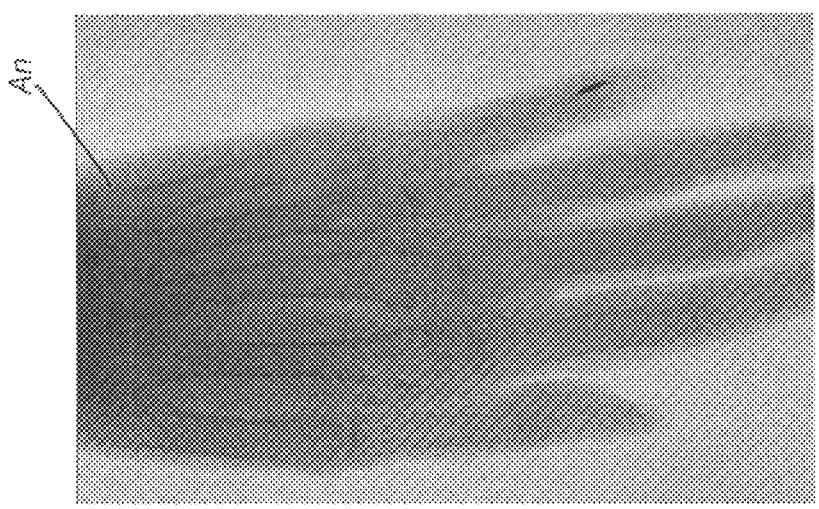
FIG. 12A shows an acquired projection image.

By way of example, FIG. 12A shows an acquired projection image An of a hand. FIG. 12B shows a synthesized image generated according to an embodiment of the present disclosure. The synthesized image can be displayed, stored, transmitted, or can be used with acquired projection images for volume reconstruction.

Consistent with at least one embodiment, the present disclosure utilizes a computer program with stored instructions that perform on image data accessed from an electronic memory. As can be appreciated by those skilled in the image processing arts, a computer program of an embodiment of the present invention can be utilized by a suitable, general-purpose computer system, such as a personal computer or workstation. However, many other types of computer systems can be used to execute the computer program of the present invention, including networked processors. The computer program for performing the method of the present invention may be stored in a computer readable storage medium. This medium may comprise, for example; magnetic storage media such as a magnetic disk such as a hard drive or removable device or magnetic tape; optical storage media such as an optical disc, optical tape, or machine readable bar code; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the internet or other communication medium. Those skilled in the art will readily recognize that the equivalent of such a computer program product may also be constructed in hardware.

It should be noted that the term "memory", equivalent to "computer-accessible memory" in the context of the present disclosure, can refer to any type of temporary or more enduring data storage workspace used for storing and operating upon image data and accessible to a computer system, including a database. The memory could be non-volatile, using, for example, a long-term storage medium such as magnetic or optical storage. Alternately, the memory could be of a more volatile nature, using an electronic circuit, such as random-access memory (RAM) that is used as a temporary buffer or workspace by a microprocessor or other control logic processor device. Displaying an image requires memory storage. Display data, for example, is typically stored in a temporary storage buffer that is directly associated with a display device and is periodically refreshed as needed in order to provide displayed data. This temporary storage buffer can also be considered to be a memory, as the term is used in the present disclosure. Memory is also used as the data workspace for executing and storing intermediate and final results of calculations and other processing. Computer-accessible memory can be volatile, non-volatile, or a hybrid combination of volatile and non-volatile types.

It will be understood that the computer program product of the present invention may make use of various image manipulation algorithms and processes that are well known. It will be further understood that the computer program product embodiment of the present invention may embody algorithms and processes not specifically shown or described herein that are useful for implementation. Such algorithms and processes may include conventional utilities that are within the ordinary skill of the image processing arts. Additional aspects of such algorithms and systems, and hardware and/or software for producing and otherwise processing the images or co-operating with the computer program product of the present invention, are not specifically shown or described herein and may be selected from such algorithms, systems, hardware, components and elements known in the art.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A method for forming an image, comprising:
   reconstructing a full volume image of a subject according to a plurality of X-ray projection images acquired from a digital detector at a plurality of acquisition angles;
   partitioning the full volume image to form at least a first sub-volume and a second non-overlapping sub-volume;
   within each partitioned sub-volume, generating a corresponding set of forward projection images for the sub-volume, wherein the corresponding set of forward projection images are generated at angles corresponding to the plurality of acquisition angles, and generating an intermediate set of intermediate forward projection images at angles between the plurality of acquisition angles;
   calculating a weight factor relating to the contribution of each pixel in the plurality of acquired X-ray projection images for each sub-volume at each acquisition angle plurality of evenly spaced;
   forming a plurality of synthesized sub-volume projection images according to the calculated weight factor and the plurality of acquired projection images in each sub-volume;
   combining the plurality of formed synthesized sub-volume projection images corresponding to each intermediate forward projection angle to form a plurality of synthesized projection images for the full volume image;
   reconstructing a second volume image according to the plurality of acquired X-ray projection images and the plurality of formed synthesized projection images; and
   displaying, storing, or transmitting a rendering of at least a portion of the reconstructed second volume image.

2. The method of claim 1 wherein partitioning is accomplished according to the geometry of image acquisition for the acquired projection images.

3. The method of claim 1 wherein partitioning is accomplished according to a voxel value for the full reconstructed volume image.

4. The method of claim 1 wherein members of the intermediate set of intermediate forward projection images are at angles midway between the plurality of acquisition angles.

5. The method of claim 1 further comprising conditioning the image content of at least one of the acquired projection images.

6. The method of claim 5 wherein conditioning the image content comprises adjusting image sharpness.

7. The method of claim 5 wherein conditioning the image comprises adjusting image contrast.

8. The method of claim 1 wherein the plurality of acquisition angles for the X-ray projection images are evenly spaced.

9. The method of claim 1 wherein reconstructing the full or second volume image is executed using an analytic reconstruction technique.

10. The method of claim 1 wherein reconstructing the full or second volume image is executed using an iterative reconstruction technique.

11. A method for forming an image comprising:
    reconstructing a full volume image of a subject according to a plurality of X-ray projection images acquired from a digital detector at a plurality of evenly spaced acquisition angles;
    partitioning the full volume image according to the angle of image acquisition for each of the plurality of X-ray projection images, to form at least a first sub-volume and a second non-overlapping sub-volume;
    within each partitioned sub-volume, generating a corresponding set of forward projection images for the sub-volume, wherein members of the corresponding set of forward projection images are generated at angles corresponding to the plurality of evenly spaced acquisition angles, and generating an intermediate set of intermediate forward projection images at angles midway between the plurality of evenly spaced acquisition angles;
    calculating a weight factor relating to the contribution of each pixel in the plurality of acquired X-ray projection images for each sub-volume at each acquisition angle of the plurality of evenly spaced acquisition angles;
    forming a plurality of synthesized sub-volume projection images according to the calculated weight factor and the plurality of acquired projection images in each sub-volume;
    combining the plurality of formed synthesized sub-volume projection images corresponding to each intermediate forward projection angle to form a plurality of synthesized projection images for the full volume image;

reconstructing a second volume image according to the plurality of acquired X-ray projection images and the plurality of formed synthesized projection images; and displaying, storing, or transmitting at least a portion of the reconstructed second volume image.

12. The method of claim 11 further comprising conditioning the image content of at least one of the acquired projection images.

13. The method of claim 12 wherein conditioning the image content comprises adjusting image sharpness.

14. The method of claim 12 wherein conditioning the image content comprises adjusting image contrast.

15. A method for forming an image comprising:
 a) reconstructing a full volume image of a subject according to a plurality of X-ray projection images acquired from a digital detector at a plurality of evenly spaced acquisition angles;
 b) partitioning the full volume image to form at least a first sub-volume and a second non-overlapping sub-volume;
 c) identifying a first acquired projection image and a second acquired projection image;
 d) within each partitioned sub-volume, generating a corresponding pair of forward projection images for the sub-volume at the acquisition angles of the first and second acquired projection images and generating an intermediate forward projection image at a third angle between the first and second acquisition angles;
 e) calculating the contribution of each pixel to each sub-volume of the first and second acquired X-ray projection images;
 f) within each sub-volume, forming a synthesized sub-volume projection image according to the calculated contribution and the first and second acquired projection images;
 g) combining the formed synthesized sub-volume projection images to form a synthesized projection image corresponding to the third angle; and
 h) displaying, storing, or transmitting at least a portion of the formed synthesized projection image.

16. The method of claim 15 further comprising reconstructing a second volume image using the formed synthesized projection image.

17. The method of claim 15 wherein partitioning the full volume image is accomplished according to the angle of image acquisition for each of the plurality of X-ray projection images.

18. The method of claim 15 wherein partitioning the full volume image is accomplished according to the content of each of the plurality of X-ray projection images.

* * * * *

UNITED STATES PATENT AND TRADEMARK OFFICE
CERTIFICATE OF CORRECTION

PATENT NO. : 10,089,758 B1
APPLICATION NO. : 15/472613
DATED : October 2, 2018
INVENTOR(S) : Lawrence A. Ray et al.

Page 1 of 1

It is certified that error appears in the above-identified patent and that said Letters Patent is hereby corrected as shown below:

In the Claims

Column 13, Claim 1, Line 61    Replace "plurality of evenly spaced;" with --of the plurality of acquisition angles;--

Signed and Sealed this
Thirtieth Day of July, 2019

Andrei Iancu
*Director of the United States Patent and Trademark Office*